United States Patent
Hosotani

(10) Patent No.: US 12,407,260 B2
(45) Date of Patent: Sep. 2, 2025

(54) POWER SUPPLY SYSTEM APPARATUS

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 287 days.

(21) Appl. No.: 18/353,364

(22) Filed: Jul. 17, 2023

(65) Prior Publication Data

US 2024/0088791 A1    Mar. 14, 2024

Related U.S. Application Data

(63) Continuation of application No. PCT/JP2022/001131, filed on Jan. 14, 2022.

(30) Foreign Application Priority Data

Jan. 19, 2021  (JP) ................. 2021-006167

(51) Int. Cl.
*H02M 3/158* (2006.01)
*H02M 1/00* (2006.01)
*H02M 1/088* (2006.01)

(52) U.S. Cl.
CPC ....... *H02M 3/1584* (2013.01); *H02M 1/0009* (2021.05); *H02M 1/088* (2013.01); *H02M 3/1586* (2021.05)

(58) Field of Classification Search
CPC ... H02M 1/088; H02M 3/1584; H02M 3/1586
See application file for complete search history.

(56) References Cited

U.S. PATENT DOCUMENTS

| | | | | |
|---|---|---|---|---|
| 6,198,261 B1* | 3/2001 | Schultz | ............... | H02M 3/1584 323/283 |
| 2015/0188437 A1* | 7/2015 | Chan | ................... | H02M 3/1584 363/46 |
| 2017/0070150 A1* | 3/2017 | Kim | ....................... | H02M 3/285 |

FOREIGN PATENT DOCUMENTS

| JP | 2006-050891 A | 2/2006 |
|---|---|---|
| JP | 2012-151937 A | 8/2012 |

(Continued)

OTHER PUBLICATIONS

International Search Report issued in PCT/JP2022/001131; mailed Mar. 8, 2022.

*Primary Examiner* — Gary A Nash
(74) *Attorney, Agent, or Firm* — Studebaker Brackett PLLC

(57) ABSTRACT

Converter units of a power supply system apparatus each perform feedback control using an individual voltage feedback loop. Master-slave control for synchronizing oscillation control signals is performed in such a manner that master control of the converter unit and slave control of the converter unit are performed. The oscillation control signals are set in such a manner that a phase difference occurs between a plurality of power conversion circuits in association with the number of power conversion circuits that are operate. The power supply system apparatus supplies power to a load, while causing the converter units to be synchronized with each other and performing a voltage conversion operation for converting the voltage of an input power supply using a plurality of power conversion circuits in the converter units.

20 Claims, 13 Drawing Sheets

(56) References Cited

FOREIGN PATENT DOCUMENTS

| WO | 2015/050094 A1 | 4/2015 | |
|---|---|---|---|
| WO | 2020/183820 A1 | 9/2020 | |
| WO | WO-2020183823 A1 * | 9/2020 | .......... H02M 1/0019 |

* cited by examiner

POWER SUPPLY SYSTEM APPARATUS

CROSS-REFERENCE TO RELATED APPLICATIONS

This application claims benefit of priority to International Patent Application No. PCT/JP2022/001131, filed Jan. 14, 2022, and to Japanese Patent Application No. 2021-006167, filed Jan. 19, 2021, the entire contents of each are incorporated herein by reference.

BACKGROUND

Technical Field

The present disclosure relates to a power supply system apparatus including a plurality of power conversion circuits.

Background Art

In International Publication No. 2020/183820, a system switching power supply apparatus is described. The system switching power supply apparatus in International Publication No. 2020/183820 includes a plurality of power conversion circuits each including an inductor, a switching circuit, and an individual analog controller, and a common controller that outputs oscillation control signals to the plurality of power conversion circuits.

The individual analog controller is formed of an analog electronic circuit. The individual analog controller includes a feedback signal generation part that detects the output state of the power conversion circuit and generates a feedback signal and a driving part that controls driving of the switching circuit in accordance with the feedback signal. The common controller is formed of a digital electronic circuit capable of performing programmable arithmetic processing.

SUMMARY

However, with the configuration described in International Publication No. 2020/183820, as the number of necessary power conversion circuits increases, control by the common controller becomes more complicated and more difficult. The common controller needs to include a large number of signal input terminals and a large number of signal output terminals, resulting in an increase in the size of the common controller. Furthermore, there is a need for a design change or design adjustment corresponding to the number of necessary power conversion circuits, and it is not easy to implement a system change.

Accordingly, present disclosure provides a power supply system apparatus capable of easily handling a change in the number of necessary power conversion circuits.

A power supply system apparatus according to the present disclosure includes a plurality of converter units each including a unit controller including a common controller and an individual analog controller.

Each of the plurality of converter units includes a plurality of power conversion circuits each including an inductor, a switching circuit, and the individual analog controller, a common input terminal to which input parts of the plurality of power conversion circuits are connected in parallel, the common input terminal being connected to an input power supply, a common output terminal to which output parts of the plurality of power conversion circuits are connected in parallel, the common output terminal being connected to a load, and the common controller that outputs oscillation control signals to the plurality of power conversion circuits. The individual analog controller includes a voltage feedback signal generation part and an individual voltage feedback loop that detect an output voltage of the common output terminal to generate a voltage feedback signal and feed back the voltage feedback signal, and a driving part that drives a switching element in the switching circuit on the basis of the voltage feedback signal.

The unit controllers, while performing feedback control using the individual voltage feedback loops, perform master-slave control for synchronizing the oscillation control signals in such a manner that master control of one of the plurality of converter units is performed and slave control of another one of the plurality of converter units is performed. The unit controllers supply power to the load, while causing the plurality of converter units to be synchronized with each other and performing a voltage conversion operation for converting a voltage of the input power supply using the plurality of power conversion circuits in the plurality of converter units.

With this arrangement, even when the number of necessary power conversion circuits changes according to the power of the load, the number of power conversion circuits to operate and phase are automatically controlled in an appropriate manner by the master-slave control.

According to the present disclosure, a power supply system apparatus capable of easily handling a change in the number of power conversion circuits and having the scalability of being able to provide a flexible design dealing with changes in electrical specifications regarding output current and output power, can be achieved. Furthermore, the common controller does not need to include a large number of signal input terminals or signal output terminals, and a versatile control circuit with a large distribution volume can be configured. Thus, a simple and non-expensive power supply system apparatus can be achieved.

DETAILED DESCRIPTION

First Embodiment

A power supply system apparatus according to a first embodiment of the present disclosure will be described with reference to drawings.
(Schematic Configuration of Power Supply System Apparatus 10U4 with 4-Unit Configuration)

Figure 1:
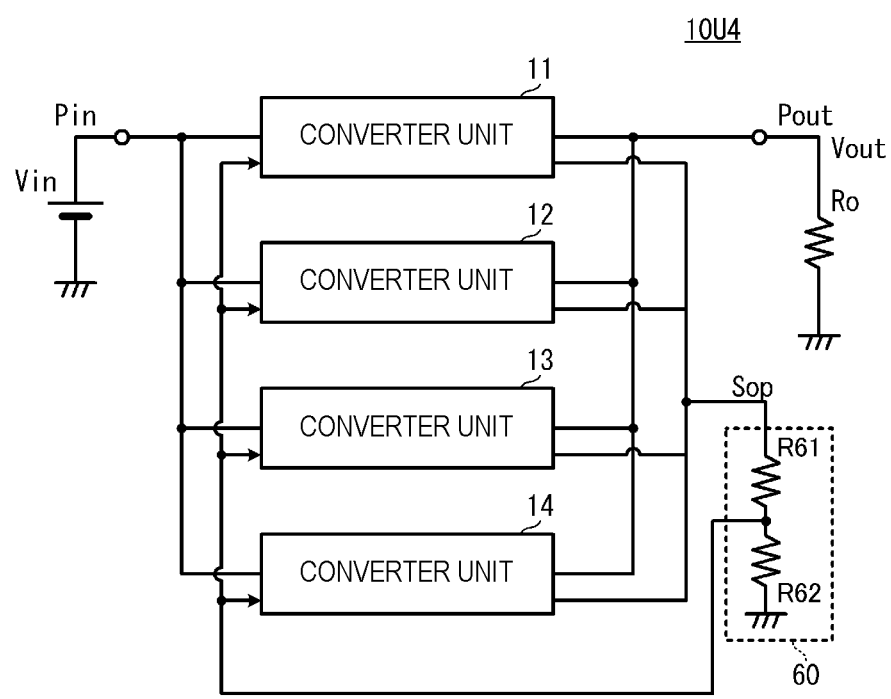
FIG. 1 is a schematic block diagram of an example (four units) of a power supply system apparatus according to a first embodiment.
Figure 2:
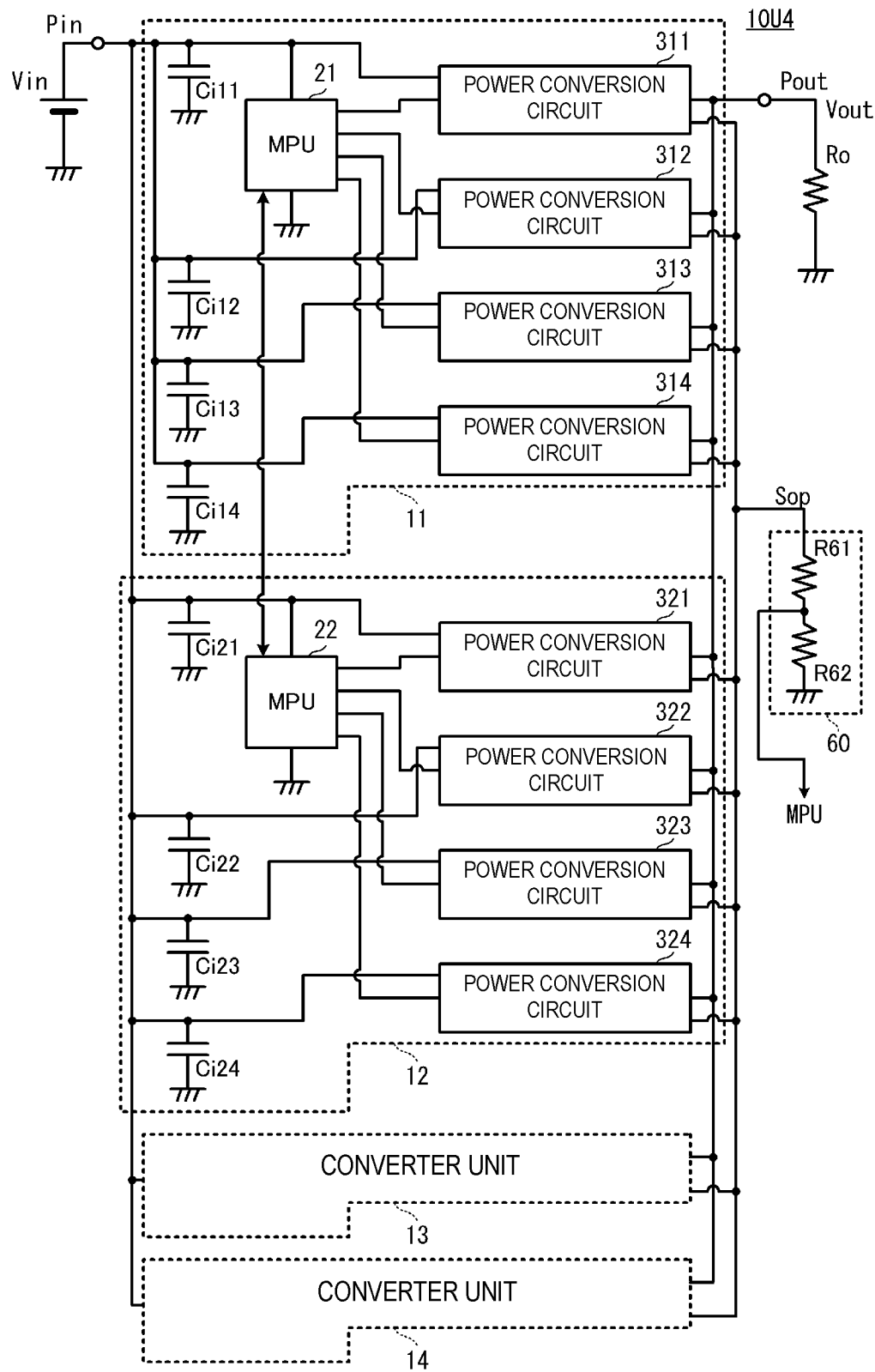
FIG. 2 is a circuit block diagram illustrating an example (four units) of the power supply system apparatus according to the first embodiment.

FIG. 1 is a schematic block diagram illustrating an example (four units) of a power supply system apparatus according to a first embodiment. FIG. 2 is a circuit block diagram illustrating the example (four units) of the power supply system apparatus according to the first embodiment.

As illustrated in FIGS. 1 and 2, the power supply system apparatus 10 includes a converter unit 11, a converter unit 12, and a voltage-dividing circuit 60. The converter unit 11 and the converter unit 12 are connected in parallel to a common input terminal Pin and a common output terminal Pout.

As illustrated in FIGS. 1 and 2, the power supply system apparatus 10U4 includes four converter units 11 to 14 and the voltage-dividing circuit 60. The four converter units 11 to 14 are connected in parallel to the common input terminal Pin and the common output terminal Pout.

The common input terminal Pin is connected to an external DC voltage source (input power supply). The power supply system apparatus 10 receives supply of a DC common input voltage Vin through the common input terminal Pin. The common output terminal Pout is connected to a load Ro. The voltage of the common output terminal Pout serves as a common output voltage Vout of the power supply system apparatus 10.

The four converter units 11 to 14 have the same circuit configuration with the exception of control modes of MPUs. The MPUs of the four converter units 11 to 14 are capable of performing data communication with one another. One of the four converter units 11 to 14 performs master control, and the other MPUs perform slave control. For example, an MPU 21 of the converter unit 11 performs master control, and MPUs of the other converter units 12 to 14 perform slave control. The MPUs of the converter units 11 to 14 correspond to "common controllers" in the present disclosure.

The converter unit 11 includes the MPU 21, a power conversion circuit 311, a power conversion circuit 312, a power conversion circuit 313, and a power conversion circuit 314. The converter unit 11 also includes an input capacitor Ci11, an input capacitor Ci12, an input capacitor Ci13, and an input capacitor Ci14.

The converter unit 12 includes an MPU 22, a power conversion circuit 321, a power conversion circuit 322, a power conversion circuit 323, and a power conversion circuit 324. The converter unit 12 also includes an input capacitor Ci21, an input capacitor Ci22, an input capacitor Ci23, and an input capacitor Ci24.

Although illustration is omitted, each of the converter units 13 and 14 includes an MPU and a plurality of power conversion circuits. Each of the converter units 13 and 14 also includes input capacitors for the individual power conversion circuits in the converter unit.

The voltage-dividing circuit 60 is a series circuit including a resistor R61 and a resistor R62. One end of the series circuit including the resistor R61 and the resistor R62 is connected to the power conversion circuits in each of the four converter units 11 to 14. The other end of the series circuit including the resistor R61 and the resistor R62 is connected to a reference potential. A connection point between the resistor R61 and the resistor R62 is connected to the MPU of each of the four converter units 11 to 14.
(Schematic Control of Power Supply System Apparatus 10U4 with Four-Unit Configuration)

The MPU of a converter unit serving as a master, for example, the MPU 21 of the converter unit 11, generates operation information including the number of circuits to operate, on the basis of a number-of-circuits-to-operate signal Sop. The operation information includes the number of circuits on the master side to operate, presence or absence of a circuit on the slave side to operate, the number of circuits on the slave side to operate, the phase of a control signal, and so on.

The MPU 21 generates control signals for the plurality of power conversion circuits 311, 312, 313, and 314 in the converter unit 11 on the basis of operation information, and outputs the generated control signals to the plurality of power conversion circuits 311, 312, 313, and 314.

The MPU 21 transmits operation information to the MPUs of the converter units 12 to 14 serving as slaves. That is, the MPU 21 serving as the master determines whether or not operation needs to be performed on the slave side, generates operation information corresponding to the determination result, and transmits the generated operation information to each of the MPUs serving as slaves.

The MPUs serving as slaves generate, based on operation information, control signals for the plurality of power conversion circuits in the converter units 12 to 14 that the MPUs control, and output the generated control signals to the plurality of power conversion circuits. The converter units 12 to 14 serving as slaves perform power conversion on the basis of the control signals from the corresponding MPUs.

As described above, when only the converter unit 11 is desired to operate, the MPU 21 causes only the converter unit 11 to operate. In contrast, for example, when the two converter units 11 and 12 are desired to operate, the MPUs of the converter units 11 and 12 are synchronized with each other to cause the two converter units 11 and 12 to concurrently operate. Furthermore, when the three converter units 11 to 13 are desired to operate, the MPUs of the converter units 11 to 13 are synchronized with one another to cause the three converter units 11 to 13 to concurrently operate. Furthermore, when the four converter units 11 to 14 are desired to operate, the MPUs of the converter units 11 to 14 are synchronized with one another to cause the four converter units 11 to 14 to concurrently operate.

Accordingly, the power supply system apparatus 10U4 can easily handle a change in the number of power conversion circuits that are to operate according to the state of the load. Thus, the power supply system apparatus 10U4 can supply an appropriate common output voltage Vout corresponding to the state of the load to the load.

Furthermore, when only the converter unit 11 is desired to operate, the MPU 21 causes the converter unit 11 to operate as a multi-phase converter. In contrast, for example, when the two converter units 11 and 12 are desired to operate, the MPUs of the converter units 11 and 12 are synchronized with each other to cause the two converter units 11 and 12 to operate in an integrated manner as a multi-phase converter. Furthermore, when the three converter units 11 to 13 are desired to operate, the MPUs of the converter units 11 to 13 are synchronized with one another to cause the three converter units 11 to 13 to operate in an integrated manner as a multi-phase converter. When the converter units 11 to 14 are desired to operate, the MPUs of the converter units 11 to 14 are synchronized with one another to cause the four converter units 11 to 14 to operate in an integrated manner as a multi-phase converter. That is, the MPU of each of the converter units controls the phase of an oscillation signal of a control signal output to a power conversion circuit that is to operate, in accordance with the number of circuits to operate.

As described above, in accordance with the number of converter units to be caused to operate, the converter units to be caused to operate are synchronized with one another, and multi-phase control of the converter units is performed. Thus, the power supply system apparatus 10U4 can reduce the ripple voltage of the common output voltage Vout.

Furthermore, with this configuration, the number of control signals generated and output by a single MPU can be reduced. Thus, the configuration processing of MPUs can be simplified. In addition, even with such simplified MPUs, various control aspects described above can be implemented easily and reliably. Since the MPUs are programmable digital electronic circuits, the above-described control can be implemented more easily than the case where the MPUs are analog circuits. The number of converter units configuring a power supply system apparatus is not limited to four. The configuration in the present disclosure can be applied and similar operational effects can be achieved as long as a plurality of (two or more) converter units configure the power supply system apparatus.

(Overall Configuration of Power Supply System Apparatus 10 with Two-Unit Configuration)

The power supply system apparatus 10U4 including the four converter units 11 to 14 has been schematically described above. Now, for easier understanding of features of the present disclosure, more specific configuration and control will be described below on the basis of the power supply system apparatus 10 including the two converter units 11 and 12.

Figure 3:
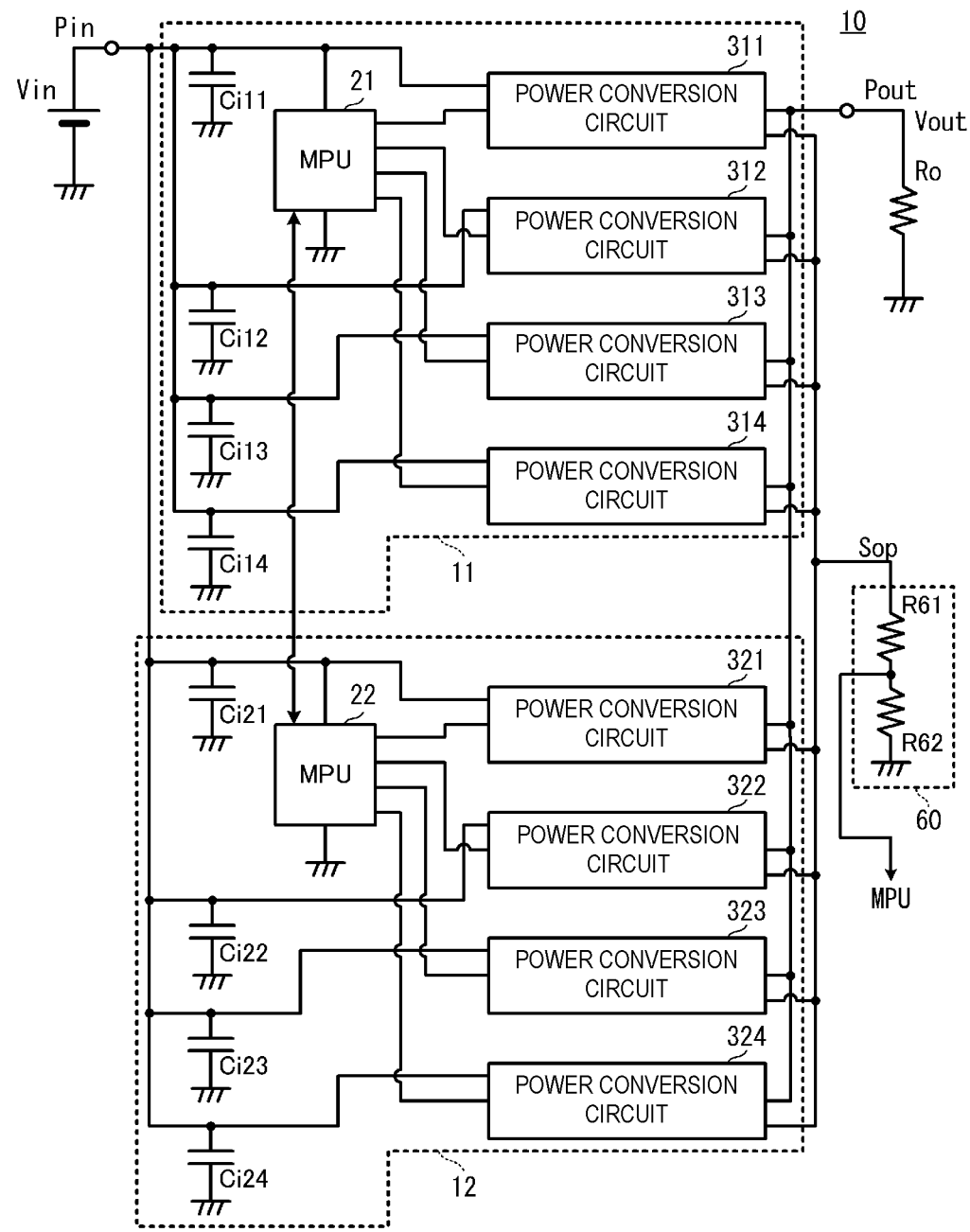
FIG. 3 is a circuit block diagram of an example (two units) of the power supply system apparatus according to the first embodiment.

FIG. 3 is a circuit block diagram illustrating an example (two units) of the power supply system apparatus according to the first embodiment. As illustrated in FIG. 3, the power supply system apparatus 10 includes the converter unit 11, the converter unit 12, and the voltage-dividing circuit 60. The converter unit 11 and the converter unit 12 are connected in parallel to the common input terminal Pin and the common output terminal Pout.

The common input terminal Pin is connected to an external DC voltage source (input power supply). The power supply system apparatus 10 receives supply of the DC common input voltage Vin through the common input terminal Pin. The common output terminal Pout is connected to the load Ro. The voltage of the common output terminal Pout serves as the common output voltage Vout of the power supply system apparatus 10.

The converter unit 11 and the converter unit 12 have the same circuit configuration with the exception of control modes of the MPU 21 and the MPU 22. The MPU 21 of the converter unit 11 and the MPU 22 of the converter unit 12 are capable of performing data communication with each other. One of the MPU 21 and the MPU 22 performs master control and the other one of the MPU 21 and the MPU 22 performs slave control. For example, the MPU 21 of the converter unit 11 performs master control, and the MPU 22 of the converter unit 12 performs slave control.

The converter unit 11 includes the MPU 21, the power conversion circuit 311, the power conversion circuit 312, the power conversion circuit 313, and the power conversion circuit 314. The converter unit 11 also includes the input capacitor Ci11, the input capacitor Ci12, the input capacitor Ci13, and the input capacitor Ci14.

The converter unit 12 includes the MPU 22, the power conversion circuit 321, the power conversion circuit 322, the power conversion circuit 323, and the power conversion circuit 324. The converter unit 12 also includes the input capacitor Ci21, the input capacitor Ci22, the input capacitor Ci23, and the input capacitor Ci24.

The voltage-dividing circuit 60 is a series circuit including the resistor R61 and the resistor R62. One end of the series circuit including the resistor R61 and the resistor R62 is connected to the power conversion circuit 311, the power conversion circuit 312, the power conversion circuit 313, and the power conversion circuit 314 of the converter unit 11 and the power conversion circuit 321, the power conversion circuit 322, the power conversion circuit 323, and the power conversion circuit 324 of the converter unit 12. The other end of the series circuit including the resistor R61 and the resistor R62 is connected to the reference potential. The connection point between the resistor R61 and the resistor R62 is connected to the MPU 21 and the MPU 22.

(Configuration of Converter Unit 11)

The MPU 21 is connected to the common input terminal Pin, and power is supplied through the common input terminal Pin to the MPU 21. This power supply line is connected to a ground reference potential through the input capacitor Ci11.

The MPU 21 includes a digital electronic circuit and is a programmable MicroProcessing Unit. The MPU 21 is a device capable of performing programmable arithmetic processing. The MPU 21 generates, by the programmable arithmetic processing, control signals (oscillation control signals) for driving parts of the plurality of power conversion circuits 311, 312, 313, and 314.

The MPU 21 is connected to the plurality of power conversion circuits 311, 312, 313, and 314. The MPU 21 outputs control signals to the plurality of power conversion circuits 311, 312, 313, and 314.

For example, the MPU 21 outputs to a power conversion circuit that is to operate (a power conversion circuit enabled to operate), out of the plurality of power conversion circuits 311, 312, 313, and 314, a control signal corresponding to the power conversion circuit, whereas does not output a control signal to a power conversion circuit that is not to operate (a power conversion circuit disabled to operate).

At this time, the MPU 21 determines the number of power conversion circuits that are to operate, on the basis of voltages obtained by dividing a number-of-circuits-to-operate signal Sop based on the common output voltage Vout by the voltage-dividing circuit 60.

A control signal output from the MPU 21 to each of the power conversion circuits includes an oscillation signal of a switching frequency of the power conversion circuit. The oscillation signals of the control signals have a phase difference, which is set by the MPU 21.

The power conversion circuit 311, the power conversion circuit 312, the power conversion circuit 313, and the power conversion circuit 314 are analog electronic circuits. Specific circuit configurations of the power conversion circuit 311, the power conversion circuit 312, the power conversion circuit 313, and the power conversion circuit 314 will be described later.

The power conversion circuit 311, the power conversion circuit 312, the power conversion circuit 313, and the power conversion circuit 314 are connected to the common input terminal Pin, and power is supplied through the common input terminal Pin to the power conversion circuit 311, the power conversion circuit 312, the power conversion circuit 313, and the power conversion circuit 314. A power supply line for the power conversion circuit 311 is connected to the ground reference potential through the input capacitor Ci11. A power supply line for the power conversion circuit 312 is connected to the ground reference potential through the input capacitor Ci12. A power supply line for the power conversion circuit 313 is connected to the ground reference potential through the input capacitor Ci13. A power supply line for the power conversion circuit 314 is connected to the ground reference potential through the input capacitor Ci14.

Output ends of the power conversion circuit 311, the power conversion circuit 312, the power conversion circuit 313, and the power conversion circuit 314 are connected to the common output terminal Pout.

The power conversion circuit 311, the power conversion circuit 312, the power conversion circuit 313, and the power conversion circuit 314 each include a voltage feedback signal generation part and an individual voltage feedback loop. With this arrangement, the power conversion circuit 311, the power conversion circuit 312, the power conversion circuit 313, and the power conversion circuit 314 receive control signals from the MPU 21, perform switching control based on PWM control, and perform corresponding power conversion. At this time, the power conversion circuit 311, the power conversion circuit 312, the power conversion circuit 313, and the power conversion circuit 314 control inductor currents on the basis of feedback signals using the corresponding individual voltage feedback loops and in accordance with the common output voltage Vout, that is, in accordance with the state of the load, appropriately and quickly.

Since control signals supplied to the power conversion circuit 311, the power conversion circuit 312, the power conversion circuit 313, and the power conversion circuit 314 have a phase difference, multi-phase control of the power conversion circuit 311, the power conversion circuit 312, the power conversion circuit 313, and the power conversion circuit 314 is performed. Thus, the ripple voltage of the common output voltage Vout is suppressed.

(Configuration of Converter Unit 12)

The MPU 22 is connected to the common input terminal Pin, and power is supplied through the common input terminal Pin to the MPU 22. This power supply line is connected to the ground reference potential through the input capacitor Ci21.

The MPU 22 includes a digital electronic circuit and is a programmable MicroProcessing Unit. The MPU 22 is a device capable of performing programmable arithmetic processing. The MPU 22 generates, by the programmable arithmetic processing, control signals (oscillation control signals) for the driving parts of the plurality of power conversion circuits 321, 322, 323, and 324.

The MPU 22 is connected to the plurality of power conversion circuits 321, 322, 323, and 324. The MPU 22 outputs control signals to the plurality of power conversion circuits 321, 322, 323, and 324.

At this time, the MPU 22 generates control signals for the plurality of power conversion circuits 321, 322, 323, and 324 on the basis of operation information (details will be described later) from the MPU 21, and outputs the generated control signals to the plurality of power conversion circuits 321, 322, 323, and 324. A control signal output from the MPU 22 to each of the power conversion circuits includes an oscillation signal of a switching frequency of the power conversion circuit. The oscillation signals of the control signals have a phase difference, which is set by the MPU 22.

The power conversion circuit 321, the power conversion circuit 322, the power conversion circuit 323, and the power conversion circuit 324 are analog electronic circuits. Specific circuit configurations of the power conversion circuits 321, 322, 323, and 324 are similar to those of the power conversion circuits 311, 312, 313, and 314.

The power conversion circuit 321, the power conversion circuit 322, the power conversion circuit 323, and the power conversion circuit 324 are connected to the common input terminal Pin, and power is supplied through the common input terminal Pin to the power conversion circuit 321, the power conversion circuit 322, the power conversion circuit 323, and the power conversion circuit 324. A power supply line for the power conversion circuit 321 is connected to the ground reference potential through the input capacitor Ci21. A power supply line for the power conversion circuit 322 is connected to the ground reference potential through the input capacitor Ci22. A power supply line for the power conversion circuit 323 is connected to the ground reference potential through the input capacitor Ci23. A power supply line for the power conversion circuit 324 is connected to the ground reference potential through the input capacitor Ci24.

Output ends of the power conversion circuit 321, the power conversion circuit 322, the power conversion circuit 323, and the power conversion circuit 324 are connected to the common output terminal Pout.

The power conversion circuit 321, the power conversion circuit 322, the power conversion circuit 323, and the power conversion circuit 324 each include a voltage feedback signal generation part and an individual voltage feedback loop. With this arrangement, the power conversion circuit 321, the power conversion circuit 322, the power conversion circuit 323, and the power conversion circuit 324 receive control signals from the MPU 22, perform switching control based on PWM control, and perform corresponding power conversion. At this time, the power conversion circuit 321, the power conversion circuit 322, the power conversion circuit 323, and the power conversion circuit 324 control inductor currents on the basis of feedback signals using the corresponding individual voltage feedback loops and in accordance with the common output voltage Vout, that is, in accordance with the state of the load, appropriately and quickly.

Since control signals supplied to the power conversion circuit 321, the power conversion circuit 322, the power conversion circuit 323, and the power conversion circuit 324 have a phase difference, multi-phase control of the power conversion circuit 321, the power conversion circuit 322, the power conversion circuit 323, and the power conversion circuit 324 is performed. Thus, the ripple voltage of the common output voltage Vout is suppressed.

(Specific Example of Master-Slave Control)

The MPU 21 of the converter unit 11, which is on the master side, generates operation information including the number of circuits to operate, on the basis of a number-of-circuits-to-operate signal Sop. The operation information includes the number of circuits on the master side to operate, presence or absence of a circuit on the slave side to operate, the number of circuits on the slave side to operate, the phase of a control signal, and so on.

The MPU 21 generates, based on the operation information, control signals for the plurality of power conversion circuits 311, 312, 313, and 314 in the converter unit 11, and outputs the generated control signals to the plurality of power conversion circuits 311, 312, 313, and 314.

The MPU 21 transmits the operation information to the MPU 22 of the converter unit 12, which is on the slave side. That is, the MPU 21 serving as the master determines whether or not operation needs to be performed on the slave side, generates operation information corresponding to the determination result, and transmits the generated operation information to the MPU 22 on the slave side.

Figure 4:
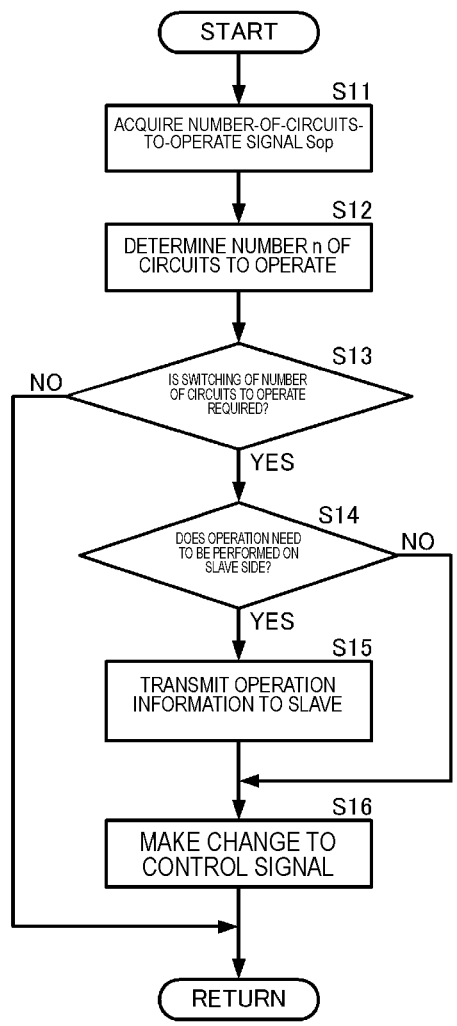
FIG. 4 is a flowchart illustrating an example of a process performed by a master-side MPU.

For example, the MPU 21 performs master control in accordance with a processing flow illustrated in FIG. 4. FIG. 4 is a flowchart illustrating an example of a process performed by the MPU on the master side.

The MPU 21 acquires the number-of-circuits-to-operate signal Sop (S11). The MPU 21 determines the number n of circuits to operate on the basis of the level of the number-of-circuits-to-operate signal Sop (S12). The MPU 21 determines whether or not switching of the number of circuits to operate is required (S13).

In the case where switching of the number of circuits to operate is required (S13: YES), the MPU 21 determines whether or not operation needs to be performed on the slave side (S14). In contrast, in the case where switching of the number of circuits to operate is not required (S13: NO), the MPU 21 maintains the current control state.

In the case where operation does not need to be performed on the slave side (S14: NO), the MPU 21 makes changes to control signals in the converter unit 11 (S16).

In the case where operation needs to be performed on the slave side (S14: YES), the MPU 21 transmits operation information to the MPU 22, which is a slave (S15), and makes changes to the control signals in the converter unit 11 (S16).

The converter unit 11 performs power conversion on the basis of the control signals from the MPU 21.

The MPU 22 generates, based on the operation information, control signals for the plurality of power conversion circuits 321, 322, 323, and 324 in the converter unit 12, and outputs the generated control signals to the plurality of power conversion circuits 321, 322, 323, and 324.

Figures 5, 6:
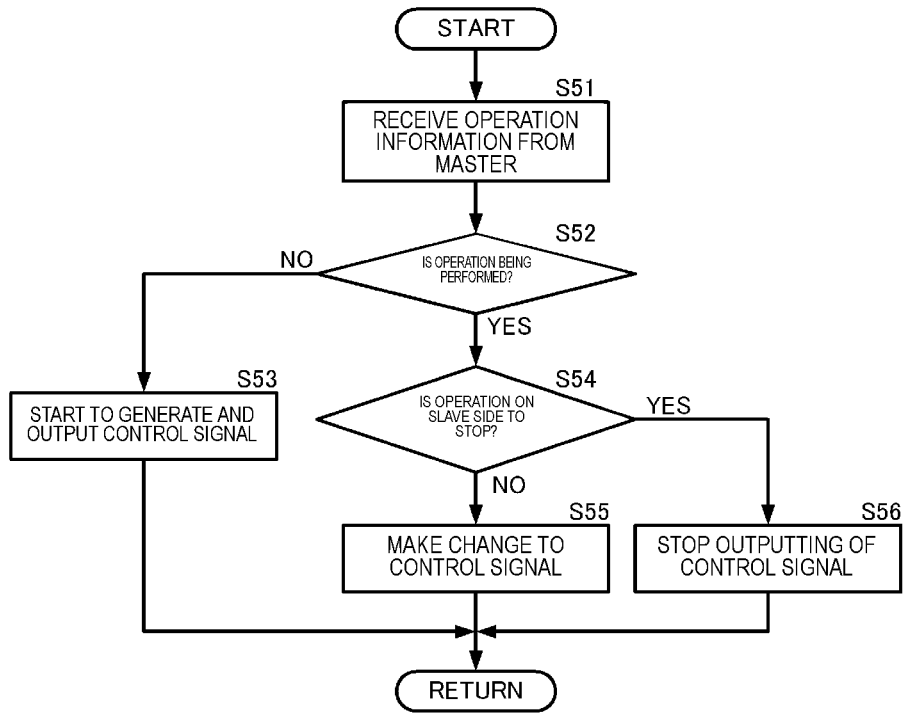
FIG. 5 is a flowchart illustrating an example of a process performed by a slave-side MPU.
FIG. 6 is a table illustrating an example of a first aspect of phase control.

For example, the MPU 22 performs slave control in accordance with a processing flow illustrated in FIG. 5. FIG. 5 is a flowchart illustrating an example of a process performed by the MPU on the slave side.

The MPU 22 receives the operation information from the MPU 21 on the master side (S51). In the case where operation needs to be performed in the converter unit 12 on the slave side and none of the power conversion circuits in the converter unit 12 is operating (S52: NO), the MPU 22 starts to generate and output a control signal to a power conversion circuit that is to operate (S53).

In the case where each power conversion circuit in the converter unit 12 is operating (S52: YES) and operation on the slave side is not to stop (S54: NO), the MPU 22 makes changes to control signals in the converter unit 12 (S55). In the case where each power conversion circuit in the converter unit 12 is operating (S52: YES) and operation on the slave side is to stop (S54: YES), the MPU 22 stops outputting of control signals to the plurality of power conversion circuits 321, 322, 323, and 324 in the converter unit 12 (S56).

The converter unit 12 performs power conversion on the basis of the control signals from the MPU 22.

As described above, when only the converter unit 11 is desired to operate, the MPU 21 causes only the converter unit 11 to operate. In contrast, when the converter unit 11 and the converter unit 12 are desired to operate, the MPU 21 and the MPU 22 are synchronized with each other to cause the converter unit 11 and the converter unit 12 to concurrently operate.

Accordingly, the power supply system apparatus 10 can easily handle a change in the number of power conversion circuits that are to operate according to the state of the load. Thus, the power supply system apparatus 10 can supply an appropriate common output voltage Vout corresponding to the state of the load to the load.

Furthermore, when only the converter unit 11 is desired to operate, the MPU 21 causes the converter unit 11 to operate as a multi-phase converter. In contrast, when the converter unit 11 and the converter unit 12 are desired to operate, the MPU 21 and the MPU 22 are synchronized with each other to cause the converter unit 11 and the converter unit 12 to operate in an integrated manner as a multi-phase converter. That is, the MPU 21 and the MPU 22 control the phases of oscillation signals of control signals output to power conversion circuits that are to operate, in accordance with the number of circuits to operate.

(First Aspect of Phase Control)

Figures 7, 8:
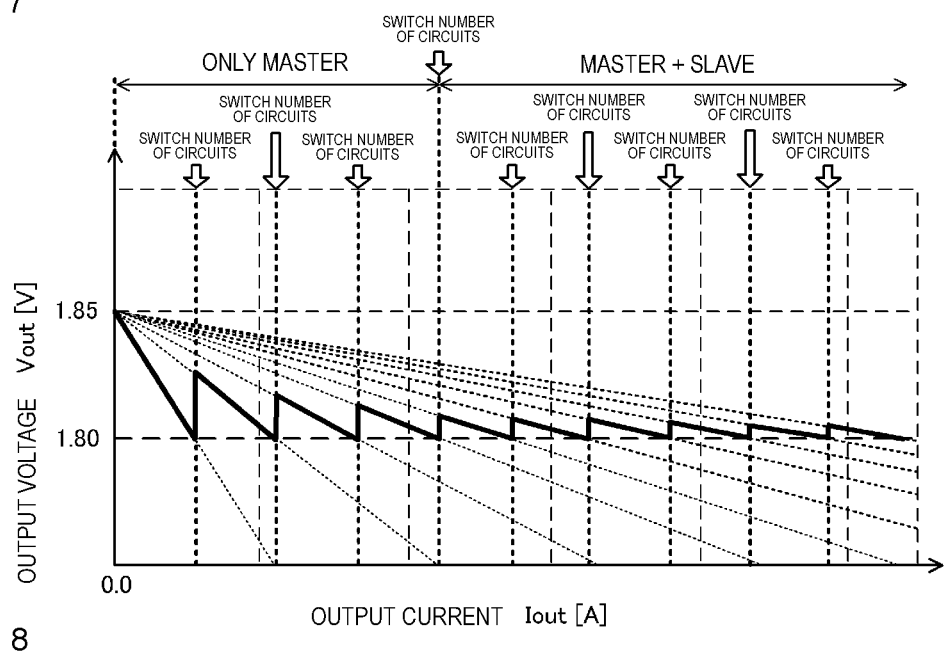
FIG. 7 is a graph illustrating the relationship between output current and output voltage for explaining the concept of switching the number of circuits to operate.
FIG. 8 is a table illustrating an example of a second aspect of phase control.

FIG. 6 is a table illustrating an example of a first aspect of a first aspect of phase control. FIG. 7 is a graph illustrating the relationship between output current and output voltage for explaining the concept of switching the number of circuits to operate. The graph illustrated in FIG. 7 includes a case where the number of circuits to operate is more than 8. In the case where the number of circuits needed to operate is 8 or more, the number of slave converter units described above can be increased.

Under the phase control illustrated in FIG. 6, a converter unit on the master side is used when an output current Tout is in a range that can be managed by the converter unit on the master side, and a converter unit on the master side and a converter unit on the slave side are used when the output current Tout is in a range that cannot be managed only by the converter unit on the master side, as illustrated in FIG. 7. Hereinafter, as described above, the case where the converter unit 11 is defined as a master and the converter unit 12 is defined as a slave will be described. Although the cases where the number n of circuits to operate is 1, 2, 4, 5, and 8 are illustrated in FIG. 6, phase control is performed based on a similar concept in a case where the number n of circuits to operate is not 1, 2, 4, 5, or 8.

As illustrated in FIG. 6, when the number n of circuits to operate is 1, the MPU 21 on the master side outputs a control signal to a power conversion circuit in the converter unit 11 and operates the power conversion circuit.

When the number n of circuits to operate is two, the MPU 21 on the master side outputs control signals to two power conversion circuits in the converter unit 11 and operates the power conversion circuits. At this time, the MPU 21 outputs a control signal (oscillation signal) with a phase θ of 0 degrees to one of the two power conversion circuits and a control signal (oscillation signal) with a phase θ of 180 degrees to the other one of the two power conversion circuits.

When the number n of circuits to operate is four, the MPU 21 on the master side outputs control signals to four power conversion circuits in the converter unit 11 and operates the power conversion circuits. At this time, the MPU 21 outputs a control signal (oscillation signal) with a phase θ of 0 degrees to one of the three power conversion circuits, a control signal (oscillation signal) with a phase θ of 90 degrees to another one of the four power conversion circuits, a control signal (oscillation signal) with a phase θ of 180 degrees to another one of the four power conversion circuits, and a control signal (oscillation signal) with a phase θ of 270 degrees to the other one of the four power conversion circuits.

When the number n of circuits to operate is five, the MPU 21 on the master side determines that the converter unit 11 and the converter unit 12 are to operate, and transmits corresponding operation information to the MPU 22 on the slave side. The MPU 22 on the slave side receives the operation information.

The MPU 21 on the master side outputs control signals to the four power conversion circuits in the converter unit 11 and operates the power conversion circuits. The MPU 22 on the slave side outputs a control signal to a power conversion circuit in the converter unit 12 and operates the power conversion circuit.

At this time, the MPU 21 outputs a control signal (oscillation signal) with a phase θ of 0 degrees to one of the four power conversion circuits in the converter unit 11, a control signal (oscillation signal) with a phase θ of 72 degrees to another one of the four power conversion circuits, a control signal (oscillation signal) with a phase θ of 144 degrees to another one of the four power conversion circuits, and a control signal (oscillation signal) with a phase θ of 216 degrees to the other one of the four power conversion circuits. The MPU 22 outputs a control signal (oscillation signal) with a phase θ of 288 degrees to a power conversion circuit in the converter unit 12.

When the number n of circuits to operate is eight, the MPU 21 on the master side determines that the converter unit 11 and the converter unit 12 are to operate, and transmits corresponding operation information to the MPU 22 on the slave side. The MPU 22 on the slave side receives the operation information.

The MPU 21 on the master side outputs control signals to the four power conversion circuits in the converter unit 11 and operates the power conversion circuits. The MPU 22 on the slave side outputs control signals to the four power conversion circuits in the converter unit 12 and operates the power conversion circuits.

At this time, the MPU 21 outputs a control signal (oscillation signal) with a phase θ of 0 degrees to one of the four power conversion circuits in the converter unit 11, a control signal (oscillation signal) with a phase θ of 45 degrees to another one of the four power conversion circuits, a control signal (oscillation signal) with a phase θ of 90 degrees to another one of the four power conversion circuits, and a control signal (oscillation signal) with a phase θ of 135 degrees to the other one of the four power conversion circuits. The MPU 22 outputs a control signal (oscillation signal) with a phase θ of 180 degrees to one of the four power conversion circuits in the converter unit 12, a control signal (oscillation signal) with a phase θ of 225 degrees to another one of the four power conversion circuits, a control signal (oscillation signal) with a phase θ of 270 degrees to another one of the four power conversion circuits, and a control signal (oscillation signal) with a phase θ of 315 degrees to the other one of the four power conversion circuits.

As described above, multi-phase control of only the converter unit 11 is performed or multi-phase control of the converter unit 11 and the converter unit 12 is performed in a synchronous manner. Thus, the power supply system apparatus 10 can reduce the ripple voltage of the common output voltage Vout.

Furthermore, under the phase control of the first aspect, the converter unit on the master side is caused to operate when the output current Tout is in a range that can be managed by only the converter unit on the master side. Thus, an unnecessary operation of the converter unit on the slave side can be suppressed, and unnecessary power loss in the converter unit on the slave side can be suppressed.

Furthermore, with this configuration, the number of control signals generated and output by a single MPU can be reduced. Thus, the configuration processing of MPUs can be simplified. In addition, even with such simplified MPUs, various control aspects described above can be implemented easily and reliably. Since the MPUs are programmable digital electronic circuits, the above-described control can be implemented more easily than the case where the MPUs are analog circuits.

(Second Aspect of Phase Control)

FIG. 8 is a table illustrating an example a second aspect of phase control.

Under the phase control illustrated in FIG. 8, when the number n of circuits to operate is two or more, the converter unit on the master side and the converter unit on the slave unit are used. Hereinafter, as described above, the case where the converter unit 11 is defined as a master and the converter unit 12 is defined as a slave will be described. Although the cases where the number n of circuits to operate is 1, 2, 4, and 8 are illustrated in FIG. 6, phase control is performed based on a similar concept in a case where the number n of circuits to operate is not 1, 2, 4, or 8.

As illustrated in FIG. 8, when the number n of circuits to operate is 1, the MPU 21 on the master side outputs a control signal to a power conversion circuit in the converter unit 11 and operates the power conversion circuit.

When the number n of circuits to operate is two or more, the MPU 21 determines that the converter unit 11 and the converter unit 12 are to operate, and transmits corresponding operation information to the MPU 22 on the slave side. The MPU 22 on the slave side receives the operation information.

When the number n of circuits to operate is two, the MPU 21 on the master side outputs a control signal to a power conversion circuit in the converter unit 11 and operates the power conversion circuit. The MPU 22 on the slave side outputs a control signal to a power conversion circuit in the converter unit 12 and operates the power conversion circuit. At this time, the MPU 21 outputs a control signal (oscillation signal) with a phase θ of 0 degrees to a power conversion circuit in the converter unit 11. The MPU 22 outputs a control signal (oscillation signal) with a phase θ of 180 degrees to a power conversion circuit in the converter unit 12.

When the number n of circuits to operate is four, the MPU 21 on the master side outputs control signals to two power conversion circuits in the converter unit 11 and operates the power conversion circuits. The MPU 22 on the slave side outputs control signals to two power conversion circuits in the converter unit 12 and operates the power conversion circuits. At this time, the MPU 21 outputs a control signal (oscillation signal) with a phase θ of 0 degrees to a power conversion circuit in the converter unit 11 and a control signal (oscillation signal) with a phase θ of 180 degrees to another power conversion circuit in the converter unit 11. The MPU 22 outputs a control signal (oscillation signal) with a phase θ of 90 degrees to a power conversion circuit in the converter unit 12 and a control signal (oscillation signal) with a phase θ of 270 degrees to another power conversion circuit in the converter unit 12.

When the number n of circuits to operate is eight, the MPU 21 on the master side outputs control signals to the four power conversion circuits in the converter unit 11 and operates the power conversion circuits. The MPU 22 on the slave side outputs control signals to the four power conversion circuits in the converter unit 12 and operates the power conversion circuits.

At this time, the MPU 21 outputs a control signal (oscillation signal) with a phase θ of 0 degrees to one of the four power conversion circuits in the converter unit 11, a control signal (oscillation signal) with a phase θ of 90 degrees to another one of the four power conversion circuits, a control signal (oscillation signal) with a phase θ of 180 degrees to another one of the four power conversion circuits, and a control signal (oscillation signal) with a phase θ of 270 degrees to the other one of the four power conversion circuits. The MPU 22 outputs a control signal (oscillation signal) with a phase θ of 45 degrees to one of the four power conversion circuits in the converter unit 12, a control signal (oscillation signal) with a phase θ of 135 degrees to another one of the four power conversion circuits, a control signal (oscillation signal) with a phase θ of 225 degrees to another one of the four power conversion circuits, and a control signal (oscillation signal) with a phase θ of 315 degrees to the other one of the four power conversion circuits.

As described above, multi-phase control of only the converter unit 11 is performed or multi-phase control of the converter unit 11 and the converter unit 12 is performed in a synchronous manner. Thus, the power supply system apparatus 10 can reduce the ripple voltage of the common output voltage Vout.

Furthermore, under the phase control of the second aspect, when n is two or more, the converter unit on the master side and the converter unit on the slave side are caused to operate in a synchronous manner. Thus, power loss can be averaged and distributed over the converter unit on the master side and the converter unit on the slave side.

Furthermore, under the phase control of the second aspect, a phase difference between a plurality of control signals output from a single MPU can be increased. Accordingly, a plurality of control signals with a desired phase difference can be reliably output. Thus, reduction in the ripple voltage can be achieved more reliably and more accurately. Furthermore, due to such control, noise and heat generation can be distributed temporally.

Furthermore, with this configuration, as in the first aspect, the number of control signals generated and output by a single MPU can be reduced. Thus, the configuration processing of MPUs can be simplified. In addition, even with such simplified MPUs, various control aspects described above can be implemented easily and reliably. Since the MPUs are programmable digital electronic circuits, the above-described control can be implemented more easily than the case where the MPUs are analog circuits.

Furthermore, in this configuration, the converter unit on the master side and the converter unit on the slave side have the same configuration. Thus, common components can be used for the converter unit on the master side and the converter unit on the slave side, and a highly practical power supply system apparatus capable of achieving a reduction in cost, shortening of a design period, and the like can be established.

The phase control of the first aspect and the phase control of the second aspect described above are examples. Other phase control may be performed as long as a converter unit on the master side and a converter unit on the slave side are synchronized with each other and phases of at least some control signals are different. Furthermore, by making phases of all the control signals different from one another, a pseudo high frequency operation of the power supply system apparatus 10 can be achieved, and power loss can further be averaged and distributed.

Furthermore, although an aspect in which control is changed in accordance with a number-of-circuits-to-operate signal Sop (dynamic control change) has been described above, the above-described master-slave configuration and control can also be applied to increase and decrease of power specifications with respect to the load (static control change).

In this case, the characteristics illustrated in FIG. 7 are obtained in advance, and the number n of circuits required to operate for the power supply system apparatus 10 is calculated. Then, setting of the use aspect of a converter unit on the master side and a converter unit on the slave side, that is, setting as to whether only a converter unit needs to be used or both a converter unit on the master side and a converter unit on the slave side need to be used, is performed in accordance with the number n of circuits to operate. Then, phase control is set in accordance with the set use aspect. Also in this case, stable, high-accuracy output characteristics and high power conversion efficiency can be achieved.

Figure 9A:
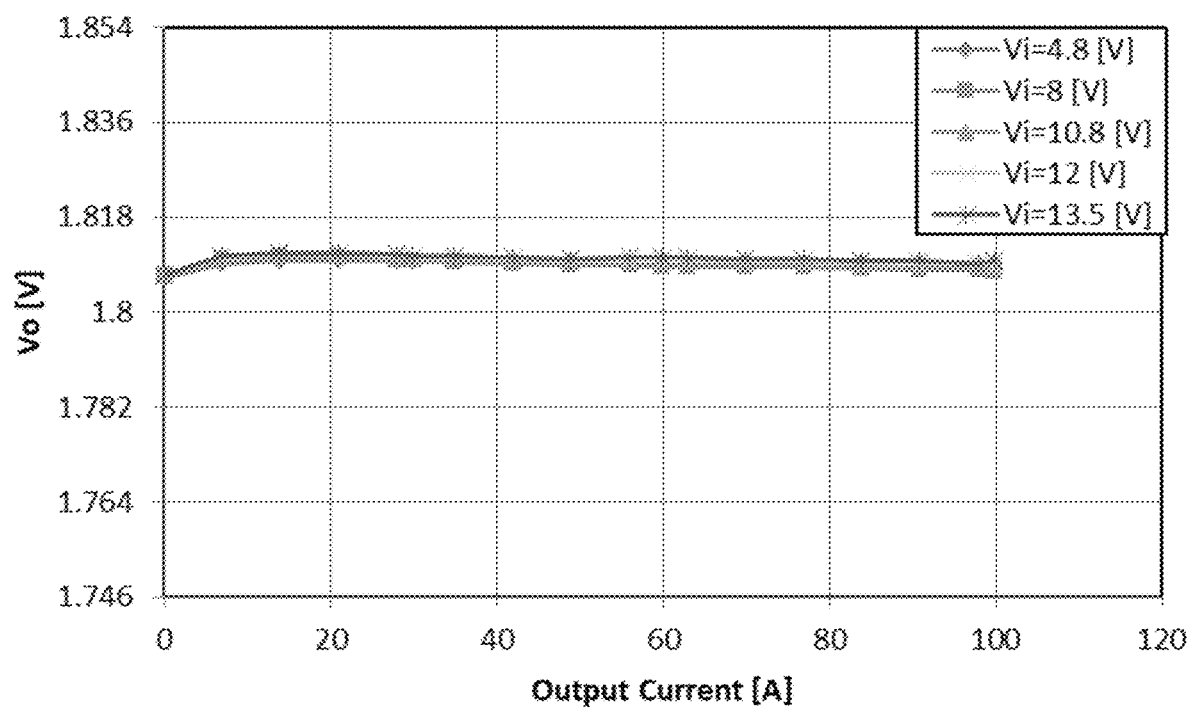
FIGS. 9A, 9B, 9C, and 9D are graphs each illustrating output voltage and power conversion efficiency with respect to output current in the case where an embodiment of the present disclosure is used.
Figure 9B:
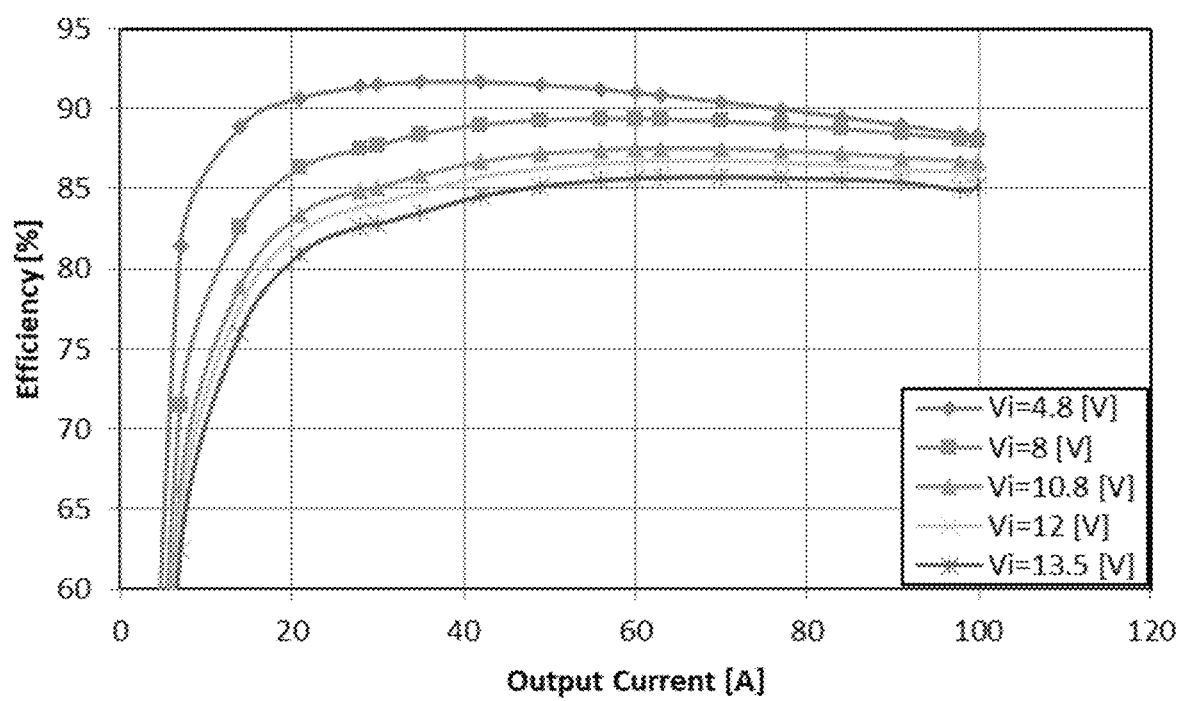
Figure 9C:
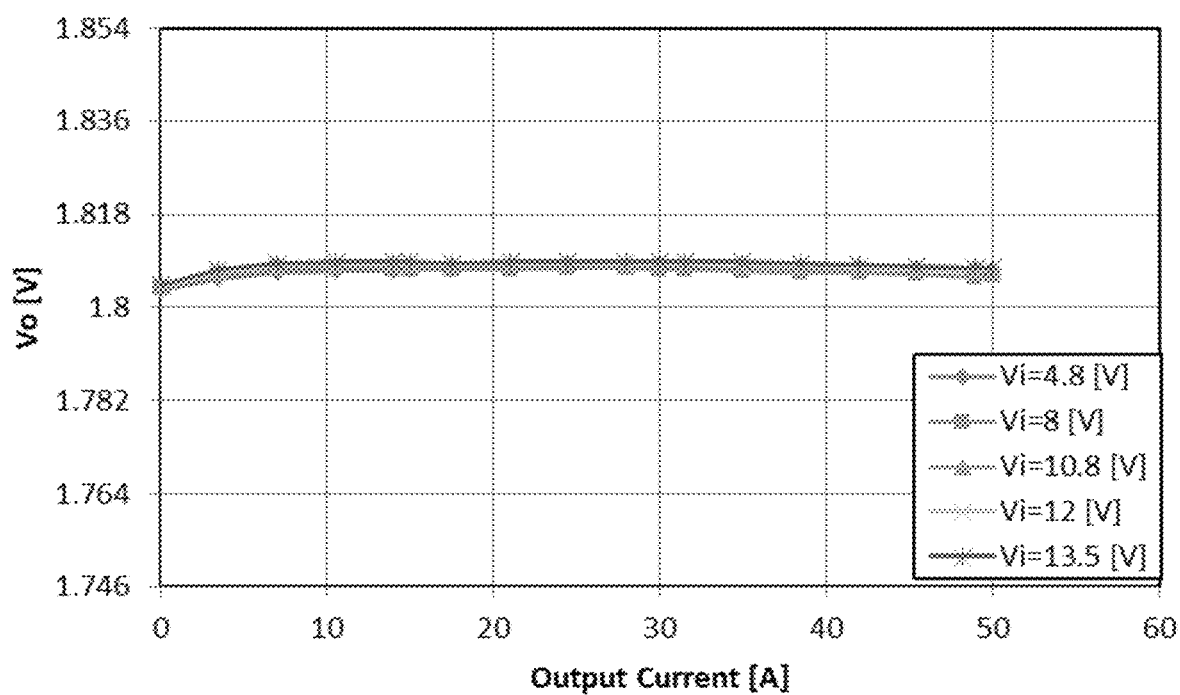
Figure 9D:
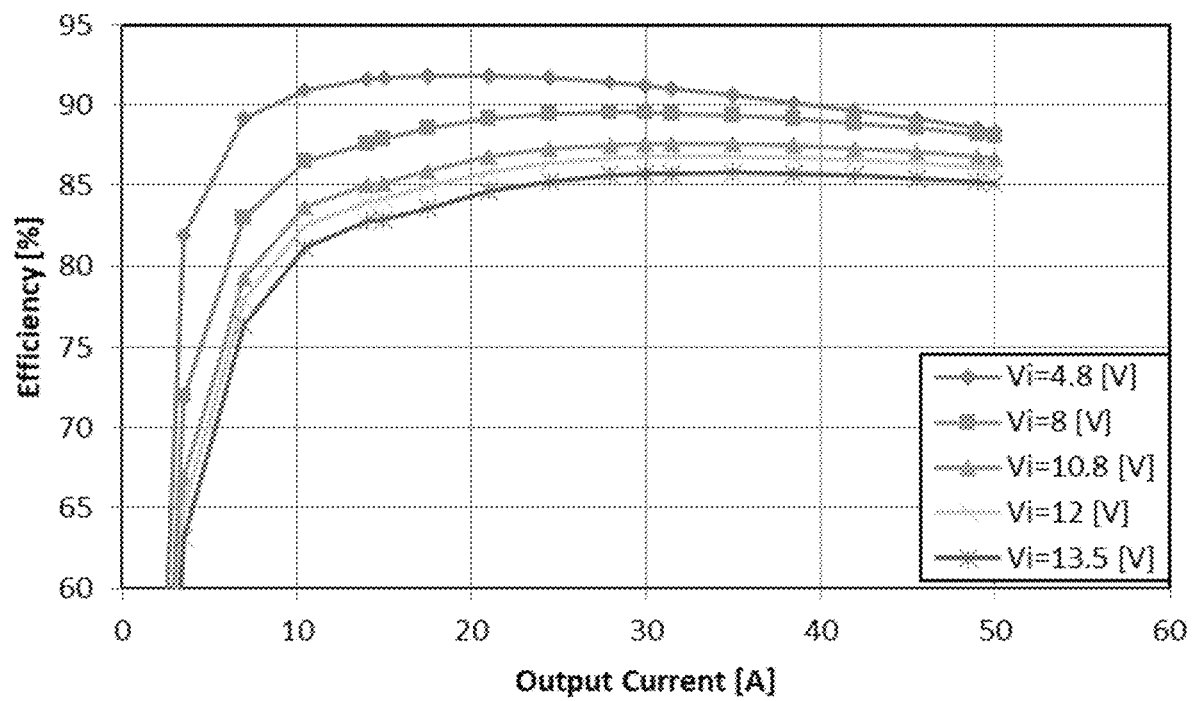

FIGS. 9A, 9B, 9C, and 9D are graphs each illustrating output voltage and power conversion efficiency with respect to output current in the case where an embodiment of the present disclosure is used. FIG. 9A illustrates output voltage characteristics in a configuration that supports an output current of 100 A. FIG. 9B illustrates power conversion efficiency in the configuration that supports the output current of 100 A. FIG. 9C illustrates output voltage characteristics in a configuration that supports an output current of 50 A. FIG. 9D illustrates power conversion efficiency in the configuration that supports the output current of 50 A.

As illustrated in FIGS. 9A, 9B, 9C, and 9D, regardless of whether the configuration supports the output current of 100 A or 50 A, stable, high-accuracy output characteristics and high power conversion efficiency can be achieved.

In particular, with this configuration, as illustrated in FIGS. 9A and 9C, even with a low output voltage of about 1.8 V, stable, high-accuracy output characteristics and high power conversion efficiency can be achieved.

(Configuration of Power Conversion Circuit (Configuration of Part Corresponding to Analog Electronic Circuit)

To achieve the above-described characteristics more effectively, more particularly, to achieve stability at a low voltage more effectively, a power conversion circuit has, for example, a configuration described below. Since the power conversion circuits 311, 312, 313, 314, 321, 322, 323, and 324 have the same circuit configuration, the power conversion circuit 311 will be described below as an example.

Figure 10:
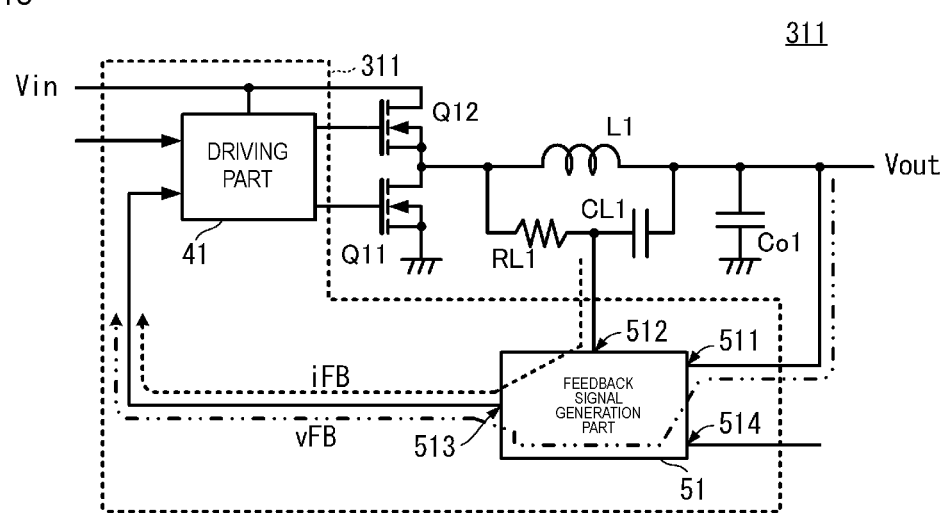
FIG. 10 is an equivalent circuit diagram of a power conversion circuit according to the first embodiment.

FIG. 10 is an equivalent circuit diagram of a power conversion circuit according to the first embodiment. As illustrated in FIG. 10, the power conversion circuit 311 includes a driving part 41, a switching element Q11, a switching element Q12, an inductor L1, an output capacitor Co1, a resistor RL1, a capacitor CL1, and a feedback signal generation part 51. The feedback signal generation part 51 includes a terminal 511, a terminal 512, a terminal 513, and a terminal 514. The terminal 511, the terminal 512, the terminal 513, and the terminal 514 may have physical terminal structures. In terms of function, however, the terminal 511, the terminal 512, the terminal 513, and the terminal 514 are connection parts to other circuit elements or the like. A circuit including the switching element Q11 and the switching element Q12 corresponds to a "switching circuit" according to the present disclosure.

The driving part 41 is connected to the common input terminal Pin, and power is supplied through the common input terminal Pin to the driving part 41. The driving part 41 is formed of an analog circuit. Furthermore, the driving part 41 and the feedback signal generation part 51 form an individual analog controller. The individual analog controller and the switching circuit configure, for example, a PWM control IC including integrated FETs.

A control signal that has been subjected to the phase control described above from the MPU 21 is input to the driving part 41. A feedback signal obtained by combining a voltage feedback signal and a current feedback signal from the feedback signal generation part 51 is input to the driving part 41. That is, an individual voltage feedback signal is fed back to the driving part 41 through an individual voltage feedback control loop vFB as indicated by a two-dot chain line in FIG. 10, and an individual current feedback signal is fed back to the driving part 41 through an individual current feedback control loop iFB as indicated by a dotted line in FIG. 10. Explanation of the individual voltage feedback control loop vFB and the individual current feedback control loop iFB will be provided later in description of the feedback signal generation part 51.

The driving part 41 generates, for each of the switching element Q11 and the switching element Q12, a switching control signal based on PWM (pulse width modulation) control from a control signal and a feedback signal. Since the driving part 41 includes an analog electronic circuit, the driving part 41 is capable of quickly outputting a PWM control signal corresponding to the voltage of a feedback signal.

The gate of the switching element Q12 is connected to the driving part 41, the drain of the switching element Q12 is connected to the common input terminal Pin, and the source of the switching element Q12 is connected to the drain of the switching element Q11. The gate of the switching element Q11 is connected to the driving part 41, and the source of the switching element Q11 is connected to the ground reference potential.

A PWM control signal for the switching element Q12 from the driving part 41 is input to the gate of the switching element Q12. A switching control signal for the switching element Q11 from the driving part 41 is input to the gate of the switching element Q11.

One end of the inductor L1 is connected to a connection point between the source of the switching element Q12 and the drain of the switching element Q11.

The other end of the inductor L1 is connected to the common output terminal Pout. The other end of the inductor L1 is connected to the ground reference potential with the output capacitor Co1 interposed therebetween.

A series circuit including the resistor RL1 and the capacitor CL1 is connected in parallel to the inductor L1. This circuit corresponds to an "inductor current detection circuit" according to the present disclosure. The resistor RL1 corresponds to a "detecting resistor" according to the present disclosure, and the capacitor CL1 corresponds to a "detecting capacitor" according to the present disclosure. A connection point between the resistor RL1 and the capacitor CL1 is connected to the terminal 512 of the feedback signal generation part 51. That is, the inductor current detection circuit for the inductor L1 is capable of outputting the voltage across the capacitor CL1 as a detection signal of an inductor current iL1 of the inductor L1 to the feedback signal generation part 51.

At this time, by setting the inductance of the inductor L1, the resistance of an equivalent series resistor Rs1 of the inductor L1, the resistance of the resistor RL1, and the capacitance of the capacitor CL1 to have a specific relationship, the inductor current detection circuit is capable of detecting, without any loss, the inductor current iL1 flowing in the inductor L1.

Specifically, the relationship of $Rs1/L1=1/(CL1 \cdot R1L)$ is used. That is, the capacitance of the capacitor CL1 and the resistance of the resistor RL1 (a time constant of a CR circuit including the capacitor CL1 and the resistor RL1 (CR time constant)) are set to satisfy the above-mentioned equation with respect to the inductance of the inductor L1 and the resistance of the equivalent series resistor Rs1 of the inductor L1. Accordingly, an inductor current $iL1(t)$ that varies with time can be detected without any loss.

(Configuration of Feedback Signal Generation Part 51)

Figure 11:
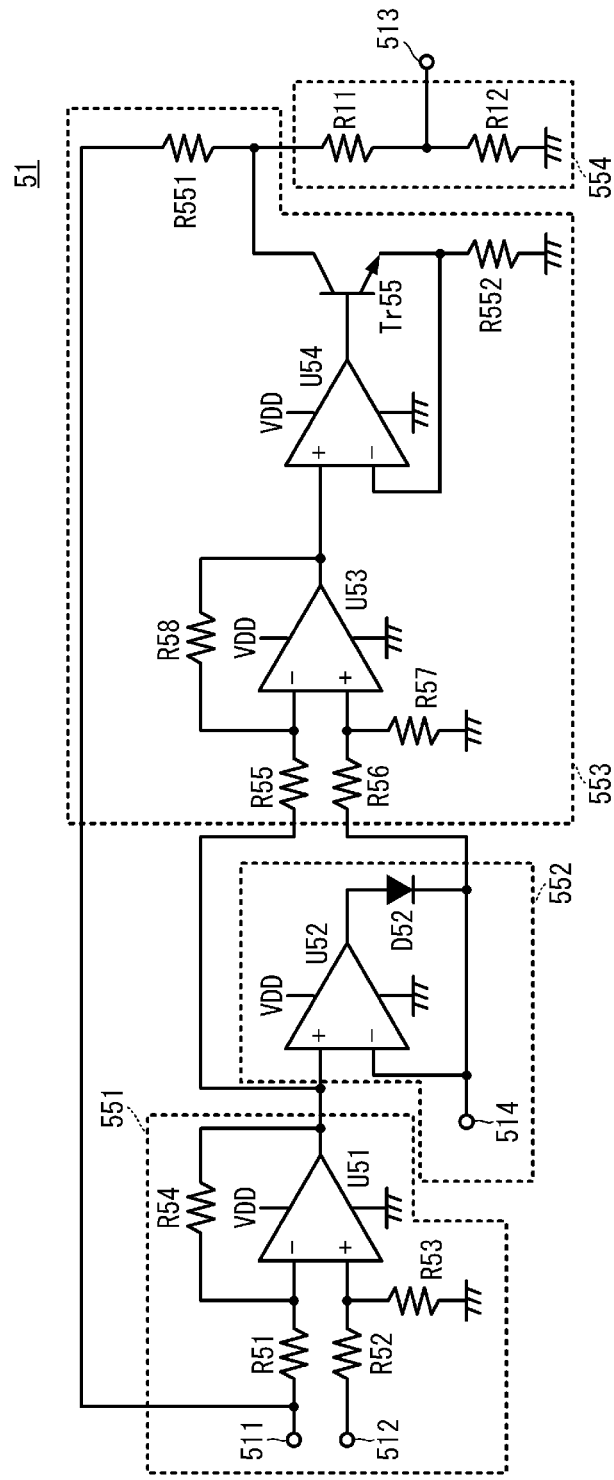
FIG. 11 is an equivalent circuit diagram illustrating an example of a feedback signal generation part according to the embodiment.

FIG. 11 is an equivalent circuit diagram illustrating an example of a feedback signal generation part according to an embodiment. As illustrated in FIGS. 10 and 11, the feedback signal generation part 51 includes the terminal 511, the terminal 512, the terminal 513, and the terminal 514. The terminal 511 is connected to the common output terminal Pout, in other words, a parallel connection part for output ends of the power conversion circuits 311, 312, 313, and 314. The terminal 512 is connected to the connection point between the resistor RL1 and the capacitor CL1. The terminal 513 is connected to the driving part 41.

The terminal 514 is connected to terminals of the feedback signal generation parts in the other power conversion circuits 312, 313, and 314 that correspond to the terminal 514. That is, the terminal 514 of the feedback signal generation part 51 in the power conversion circuit 311 and the terminals of the feedback signal generation parts in the other power conversion circuits 312, 313, and 314 that correspond to the terminal 514 are connected to a common node. The common node is an output part for the number-of-circuits-to-operate signal Sop and is connected to the MPU 20 with the voltage-dividing circuit 60 interposed therebetween.

The feedback signal generation part 51 includes an analog circuit. The feedback signal generation part 51 generates a feedback signal for the driving part 41 on the basis of the common output voltage Vout, the inductor current iL1 of the inductor L1, and the voltage of the common node (voltage of a common bus signal (number-of-circuits-to-operate signal)).

The feedback signal generation part 51 includes an individual current signal generator 551, a common signal generator 552, an individual feedback signal generator 553, and a voltage adjustment circuit 554.

The individual current signal generator 551 includes an amplifier U51, a resistor R51, a resistor R52, a resistor R53, and a resistor R54.

An inverting input terminal of the amplifier U51 is connected the terminal 511 with the resistor R51 interposed therebetween. A non-inverting input terminal of the amplifier U51 is connected to the terminal 512 with the resistor R52 interposed therebetween. The resistance of the resistor R51 and the resistance of the resistor R52 are the same. The resistor R53 is connected between the non-inverting input terminal and the ground reference potential. An output terminal of the amplifier U51 is connected to the inverting input terminal of the amplifier U51 with the resistor R54 interposed therebetween. The resistance of the resistor R53 and the resistance of the resistor R54 are the same. Driving power VDD is supplied to the amplifier U51. With this circuit arrangement, the individual current signal generator 551 implements a differential amplifier circuit.

The terminal 511 is connected to the common output terminal Pout, and the terminal 512 is connected to the connection point between the capacitor CL1 and the resistor RL1. Accordingly, there is a potential difference corresponding to the inductor current iL1 between the non-inverting input terminal and the inverting input terminal of the amplifier U51. A signal based on the inductor current iL1 is amplified at a predetermined amplification rate and output as an individual current signal from the output terminal of the amplifier U51, that is, an output terminal of the individual current signal generator 551.

The common signal generator 552 includes an amplifier U52 and a diode D52. A non-inverting input terminal of the amplifier U52 is connected to the output terminal of the amplifier U51. An output terminal of the amplifier U52 is connected to an inverting input terminal of the amplifier U52 with the diode D52 interposed therebetween. The anode of the diode D52 is connected to the output terminal, and the cathode of the diode D52 is connected to the inverting input terminal. The inverting input terminal is connected to the terminal 514, that is, the common node. The driving power VDD is supplied to the amplifier U52.

With this circuit arrangement, the common signal generator 552 implements a maximum value holding circuit for individual current signals for the plurality of power conversion circuits 311, 312, 313, and 314. A signal indicating the maximum value of the individual current signals serves as a number-of-circuits-to-operate signal Sop and corresponds to a "common bus signal" in the present disclosure.

The individual feedback signal generator 553 includes an amplifier U53, an amplifier U54, a transistor Tr55, a resistor R55, a resistor R56, a resistor R57, a resistor R58, a resistor R551, and a resistor R552.

An inverting input terminal of the amplifier U53 is connected to the output terminal of the amplifier U51 with the resistor R55 interposed therebetween. A non-inverting input terminal of the amplifier U53 is connected to the cathode of the diode D52 and the terminal 514 with the resistor R56 interposed therebetween. The resistance of the resistor R55 and the resistance of the resistor R56 are the same. The resistor R57 is connected between a non-inverting input terminal of the amplifier U53 and the ground reference potential. An output terminal of the amplifier U53 is connected to the inverting input terminal of the amplifier U53 with the resistor R58 interposed therebetween. The resistance of the resistor R57 and the resistance of the resistor R58 are the same. The driving power VDD is supplied to the amplifier U53.

A non-inverting input terminal of the amplifier U54 is connected to the output terminal of the amplifier U53. An output terminal of the amplifier U54 is connected to the base of the transistor Tr55 of an NPN type. The collector of the transistor Tr55 is connected to the terminal 511 with the resistor R551 interposed therebetween. The emitter of the transistor Tr55 is connected to the ground reference potential with the resistor R552 interposed therebetween. The emitter of the transistor Tr55 is connected to an inverting input terminal of the amplifier U54.

An individual current signal is input to the inverting input terminal of the amplifier U53, and a common bus signal is input to the non-inverting input terminal of the amplifier U53. Accordingly, a potential difference between the common bus signal and the individual current signal occurs between the non-inverting input terminal and the inverting input terminal of the amplifier U53. A signal based on the potential difference between the common bus signal and the individual current signal is amplified at a predetermined amplification rate and output from the output terminal of the amplifier U53 to the amplifier U54.

A voltage-current conversion circuit is implemented by a circuit including the amplifier U54, the transistor Tr55, and the resistor R552. Specifically, in this circuit, when a differential signal (differential voltage) is applied to the non-inverting input terminal of the amplifier U54, a differential signal (differential current Iadj) flows between the collector and emitter of the transistor Tr55. This differential current corresponds to an individual current feedback signal.

Due to flowing of the differential current Iadj, the voltage of the connection point between the resistor R551 and a resistor R11 (collector of the transistor Tr55) is expressed by Vout−(Rr551×Iadj), where Rr551 represents the resistance of the resistor R551.

The common output voltage Vout is the same as the individual voltage feedback signal. Thus, the individual feedback signal generator 553 is capable of generating and outputting a feedback signal obtained by combining an individual current feedback signal and an individual voltage feedback signal.

The voltage adjustment circuit 554 is a so-called voltage-dividing circuit and includes a series circuit including a resistor R11 and a resistor R12. The resistor R11 is connected to a connection point between the collector of the transistor Tr55 and the resistor R551 in the individual feedback signal generator 553. The resistor R12 is connected to the ground reference potential. A connection point between the resistor R11 and the resistor R12 is connected to the terminal 513. The terminal 513 serves as an output terminal for a feedback signal in the feedback signal generation part 51.

Accordingly, the voltage adjustment circuit 554 converts the voltage of a feedback signal output from the individual feedback signal generator 553 into a voltage that can be supported by the driving part 41 and outputs the voltage-converted feedback signal to the terminal 513.

The feedback signal output to the terminal 513 is fed back to the driving part 41. Thus, the individual voltage feedback control loop vFB (two-dot chain line in FIG. 10) and the individual current feedback control loop iFB (dotted line in FIG. 10), which have been described above in the description of the driving part 41, are implemented.

The driving part 41 performs the PWM control described above using the feedback signal.

Thus, even when a rapid change in the load occurs, the common output voltage Vout can quickly respond to the change in the load. That is, when the common output voltage Vout changes in response to a change in the load, the change in the common output voltage Vout is reflected in an individual voltage feedback signal included in the feedback signal. The driving part 41 performs PWM control in such a manner that the common output voltage Vout is stabilized, on the basis of the change in the individual voltage feedback signal.

Thus, the power conversion circuit 311 and the plurality of power conversion circuits 312, 313, and 314 that are connected in parallel to the power conversion circuit 311 can quickly respond to a rapid change in the common output voltage Vout and stabilize the common output voltage Vout. Furthermore, since each of the individual analog controllers includes an analog electronic circuit, a quicker response and a more stable common output voltage Vout can be achieved.

Control by a power conversion circuit that contributes greatly to the common output voltage Vout at the point in time practically operates on control of the individual voltage feedback signal. For example, during the period in which the power conversion circuit 311 practically outputs the common output voltage Vout, PWM control for stabilizing the common output voltage Vout by the power conversion circuit 311 practically operates. Furthermore, during the period in which the power conversion circuit 312 practically outputs the common output voltage Vout, PWM control for stabilizing the common output voltage Vout by the power conversion circuit 312 practically operates.

Thus, unless feedback control is performed using an individual current feedback signal as in the present application, power loss in a specific power conversion circuit increases, and the power efficiency as the power supply system apparatus 10 cannot be improved.

However, by performing feedback control using an individual current feedback signal as in the present application, inductor currents in a plurality of power conversion circuits that are connected in parallel to one another can be averaged. Thus, power loss in the plurality of power conversion circuits can be averaged.

As a result, the power supply system apparatus 10 can further improve the power efficiency, distribute heat generated by power loss, and improve reliability while achieving operational effects of multi-phase control based on master-slave control. Furthermore, since the individual analog controllers each include an analog electronic circuit, the power supply system apparatus 10 can achieve rapid control of averaging the power loss.

Second Embodiment

Figure 12:
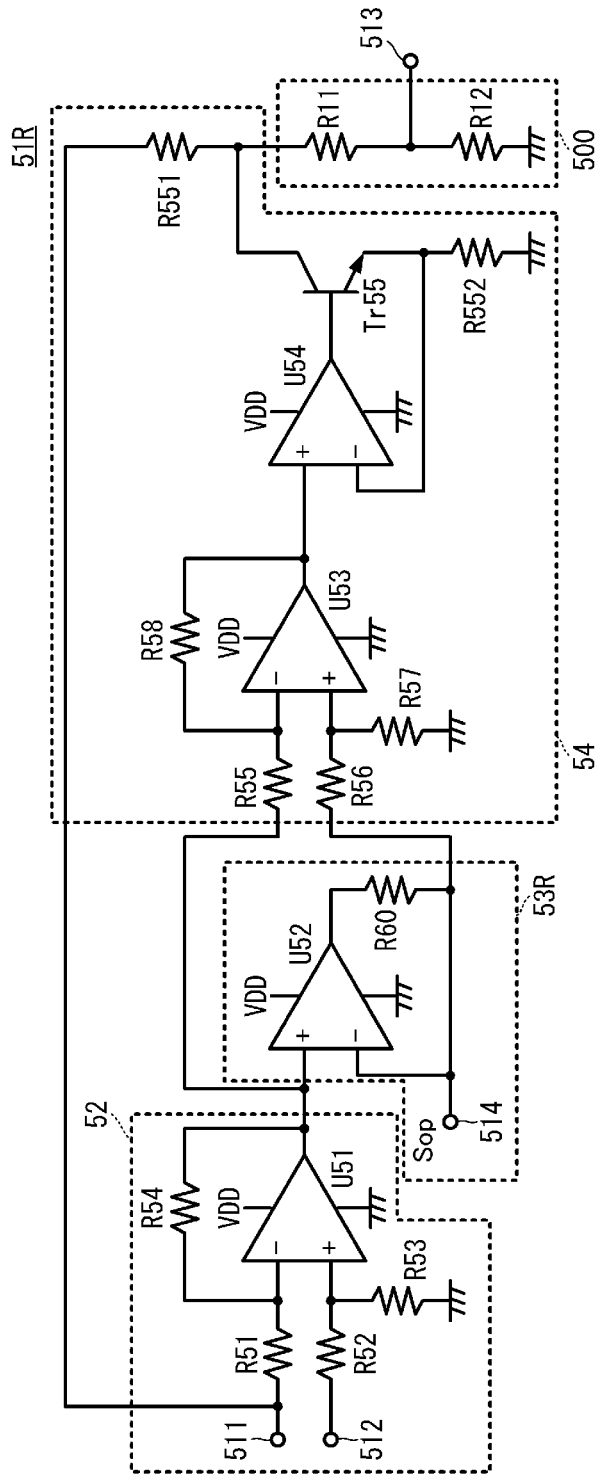
FIG. 12 is an equivalent circuit diagram of a feedback signal generation part in a power supply system apparatus according to a second embodiment.

A power supply system apparatus according to a second embodiment of the present disclosure will be described with reference to a drawing. FIG. 12 is an equivalent circuit diagram of a feedback signal generation part of the power supply system apparatus according to the second embodiment.

As illustrated in FIG. 12, a feedback signal generation part 51R of the power supply system apparatus according to the second embodiment is different from the feedback signal generation part 51 of the power supply system apparatus 10 according to the first embodiment in using a common signal generator 53R. The other configurations of the feedback signal generation part 51R are similar to those of the feedback signal generation part 51, and explanation of the similar configurations will be omitted.

The common signal generator 53R includes a resistor R60. The resistor R60 is connected between the output terminal and the inverting input terminal of the amplifier U52. With this arrangement, an average value calculation circuit including the amplifier U52 and the resistor R60 is implemented.

The common signal generator 53R defines the average value signal as a common bus signal. As described above, even with the use of the average value signal as a common bus signal, processing similar to that for the maximum value signal described above can be achieved.

In each of the embodiments described above, as a method for selecting a power conversion circuit that is caused to operate, an arrangement pattern of a plurality of power conversion circuits on a circuit substrate may be taken into consideration. For example, power conversion circuits with a long distance therebetween are sequentially selected. Thus, heat generation on the circuit substrate can be distributed, and the reliability of the power supply system apparatus can be improved.

Furthermore, although the number of power conversion circuits included in a converter unit is four in the embodiments described above, the number of power conversion circuits included in a converter unit is not limited as long as it is plural.

What is claimed is:

1. A power supply system apparatus comprising:
    a plurality of converters each including a unit controller including a common controller and an individual analog controller,
    wherein each of the plurality of converters includes
        a plurality of power conversion circuits each including an inductor, a switching circuit, and the individual analog controller,
        a common input terminal to which inputs of the plurality of power conversion circuits are connected in parallel, the common input terminal being connected to an input power supply,
        a common output terminal to which outputs of the plurality of power conversion circuits are connected in parallel, the common output terminal being connected to a load, and
        the common controller configured to output oscillation control signals to the plurality of power conversion circuits,
    wherein the individual analog controller includes
        a voltage feedback signal generator and an individual voltage feedback loop configured to detect an output voltage of the common output terminal to generate a voltage feedback signal and feed back the voltage feedback signal, and
        a driver configured to drive a switching element in the switching circuit on the basis of the voltage feedback signal, and
    wherein the unit controllers are configured to,
        while performing feedback control using the individual voltage feedback loops,
        perform master-slave control for synchronizing the oscillation control signals in such a manner that master control of one of the plurality of converters is performed and slave control of another one of the plurality of converters is performed, and
        supply power to the load, while causing the plurality of converters to be synchronized with each other and performing a voltage conversion operation for converting a voltage of the input power supply using the plurality of power conversion circuits in the plurality of converters.

2. The power supply system apparatus according to claim 1, wherein
    the common controller includes a programmable microprocessor.

3. The power supply system apparatus according to claim 2, wherein
    the common controller is configured to output the oscillation control signals with different phases of switching frequencies to the plurality of power conversion circuits.

4. The power supply system apparatus according to claim 2, wherein
    a unit controller based on the slave control among the plurality of unit controllers is configured to shift a reference phase by a predetermined value with respect to a unit controller based on the master control among the plurality of unit controllers.

5. The power supply system apparatus according to claim 2, wherein
the plurality of unit controllers are configured to set different phases of the oscillation control signals for the plurality of power conversion circuits.

6. The power supply system apparatus according to claim 2,
wherein the voltage feedback signal generator includes
a common node that connects the plurality of power conversion circuits in parallel,
an individual current signal generator configured to generate an individual current signal based on a current of the inductor in the corresponding one of the plurality of power conversion circuits, and
a common signal generator configured to generate a common bus signal flowing to the common node on the basis of the individual current signal for the corresponding one of the plurality of power conversion circuits, and
wherein the voltage feedback signal generator is configured to generate an individual current feedback signal on the basis of a difference between the individual current signal and the common bus signal and outputs the individual current feedback signal as the voltage feedback signal.

7. The power supply system apparatus according to claim 2, further comprising:
inductor current detection circuits configured to detect currents of the inductors,
wherein each of the inductor current detection circuits includes a series circuit including a detecting capacitor and a detecting resistor and connected in parallel to the inductor,
wherein the detecting capacitor and the detecting resistor have a CR time constant that exhibits a specific relationship with respect to a specific inductance and a specific AC resistance at a switching frequency of the inductor, and
wherein a voltage across the detecting capacitor is defined as a detection signal of the current of the inductor.

8. The power supply system apparatus according to claim 2, wherein
the switching circuit and the individual analog controller configure a PWM control IC including integrated FETs.

9. The power supply system apparatus according to claim 1, wherein
the common controller is configured to output the oscillation control signals with different phases of switching frequencies to the plurality of power conversion circuits.

10. The power supply system apparatus according to claim 1, wherein
a unit controller based on the slave control among the plurality of unit controllers is configured to shift a reference phase by a predetermined value with respect to a unit controller based on the master control among the plurality of unit controllers.

11. The power supply system apparatus according to claim 10, wherein
a phase of the predetermined value is a phase of 180 degrees.

12. The power supply system apparatus according to claim 1, wherein
the plurality of unit controllers are configured to set different phases of the oscillation control signals for the plurality of power conversion circuits.

13. The power supply system apparatus according to claim 1,
wherein the voltage feedback signal generator includes
a common node that connects the plurality of power conversion circuits in parallel,
an individual current signal generator configured to generate an individual current signal based on a current of the inductor in the corresponding one of the plurality of power conversion circuits, and
a common signal generator configured to generate a common bus signal flowing to the common node on the basis of the individual current signal for the corresponding one of the plurality of power conversion circuits, and
wherein the voltage feedback signal generator is configured to generate an individual current feedback signal on the basis of a difference between the individual current signal and the common bus signal and outputs the individual current feedback signal as the voltage feedback signal.

14. The power supply system apparatus according to claim 13, wherein
the voltage feedback signal generator is configured to output, as the voltage feedback signal, a signal obtained by adding the individual current feedback signal to the output voltage of the common output terminal.

15. The power supply system apparatus according to claim 14, wherein
the common signal generator is configured to generate the common bus signal on the basis of a maximum value of the individual current signals for the plurality of power conversion circuits.

16. The power supply system apparatus according to claim 14, wherein
the common signal generator is configured to generate the common bus signal on the basis of an average value of the individual current signals for the plurality of power conversion circuits.

17. The power supply system apparatus according to claim 13, wherein
the common signal generator is configured to generate the common bus signal on the basis of a maximum value of the individual current signals for the plurality of power conversion circuits.

18. The power supply system apparatus according to claim 13, wherein
the common signal generator is configured to generate the common bus signal on the basis of an average value of the individual current signals for the plurality of power conversion circuits.

19. The power supply system apparatus according to claim 1, further comprising:
inductor current detection circuits configured to detect currents of the inductors,
wherein each of the inductor current detection circuits includes a series circuit including a detecting capacitor and a detecting resistor and connected in parallel to the inductor,
wherein the detecting capacitor and the detecting resistor have a CR time constant that exhibits a specific relationship with respect to a specific inductance and a specific AC resistance at a switching frequency of the inductor, and wherein a voltage across the detecting capacitor is defined as a detection signal of the current of the inductor.

20. The power supply system apparatus according to claim 1, wherein
the switching circuit and the individual analog controller configure a PWM control IC including integrated FETs.

* * * * *